United States Patent [19]

Butters et al.

[11] Patent Number: 5,589,078
[45] Date of Patent: Dec. 31, 1996

[54] ADVANCED FILTRATION TECHNIQUE FOR FLUID PURIFICATION

[76] Inventors: Brian E. Butters, 122 Fairview Ave., St. Thomas, Ontario, Canada, M5R 4X6; Anthony L. Powell, 10 Moreau Crescent, London, Ontario, Canada, N5V 4S6

[21] Appl. No.: 478,226

[22] Filed: Jun. 7, 1995

[51] Int. Cl.$^6$ .................................................. C02F 1/48
[52] U.S. Cl. .................... 210/748; 210/650; 210/651; 210/323.2; 210/490; 210/500.25; 210/104; 210/257.1
[58] Field of Search ................... 210/510.1, 748, 210/650, 651, 323.1, 323.2, 490, 500.25, 104, 257.1; 250/432 R, 435, 436; 204/158.2; 422/186.3, 24

[56] References Cited

U.S. PATENT DOCUMENTS

| | | | |
|---|---|---|---|
| 4,446,236 | 5/1984 | Clyde | 435/287 |
| 4,524,091 | 6/1985 | Blasow et al. | 427/74 |
| 4,615,799 | 10/1986 | Mortensen | 210/117 |
| 4,694,179 | 9/1987 | Lew et al. | 250/431 |
| 4,888,101 | 12/1989 | Cooper | 204/157 |
| 4,892,712 | 1/1990 | Robertson et al. | 422/186 |
| 5,118,422 | 6/1992 | Cooper et al. | 210/636 |
| 5,174,877 | 12/1992 | Cooper et al. | 204/193 |

FOREIGN PATENT DOCUMENTS

| | | | |
|---|---|---|---|
| WO90/03946 | 4/1990 | WIPO | C02F 1/34 |
| WO92/07797 | 5/1992 | WIPO | C02F 1/32 |
| WO94/19284 | 9/1994 | WIPO | C02F 1/32 |

OTHER PUBLICATIONS

User's Manual SCT Membranes–"Membrolox®".

*Primary Examiner*—Neil McCarthy

[57] ABSTRACT

A method and system for fluid purification is disclosed herein. In accordance with the present invention, an improved technique for recovering a decontaminated effluent after photocatalytic decontamination of a contaminated fluid is achieved. A slurry is formed by mixing a contaminated fluid with photocatalytic particles having an agglomeration property, and the photocatalytic particles are excited to render a treated slurry that includes a decontaminated fluid and the photocatalytic particles. The treated slurry is directed into a filter unit that includes at least one separation element. Each separation element has an inner surface defined by a channel extending through a substrate, and a plurality of pores which derive from the inner surface and extend through the substrate. The treated slurry is passed through the separation element and the agglomerated photocatalytic particles are allowed to form a layer at or near the inner surface of the separation element. Decontaminated effluent can then be recovered through the plurality of pores of the separation element. The treated slurry is preferably degassified in a tank before it is presented to the filter unit. Further, the amounts of recovered decontaminated effluent is preferably limited based on the level of treated slurry in the tank.

22 Claims, 2 Drawing Sheets

5,589,078

ADVANCED FILTRATION TECHNIQUE FOR FLUID PURIFICATION

FIELD OF THE INVENTION

The present invention relates generally to an advanced filtration technique for use in connection with the purification of a contaminated fluid.

BACKGROUND OF THE INVENTION

A photoreactive catalyst, commonly referred to as a "photocatalyst," is a collection of photocatalytic particles. Slurries result from the mixture of a contaminated fluid with a photocatalyst. Exciting the photocatalyst (for example, with light of sufficient energy) creates the formation of electrons and holes on the surface of the photocatalyst. Electrochemical modifications to the contaminated fluid result from such formation. Such electrochemical modifications are generally referred to as a "photocatalytic reaction." Photocatalytic reactions are employed for numerous purposes, such as decomposition, photosynthesis, the oxidation of contaminants, the reduction of contaminants, the sterilization of bacteria, deposition of metals, and the like. For example, a photocatalytic reaction can serve to oxidize toxic organics into carbon dioxide and water.

A catalytic action results when a catalyst lowers the "activation energy" that is required to complete a chemical reaction. In photocatalytic reactions, activation energy is provided by the photon energy of incident band-gap light. Incident band-gap light is absorbed by a photocatalyst, electron and hole charge carrier pairs are produced within the photocatalytic particles. These charge carriers then induce reduction/oxidation ("redox") reactions. These reactions have the effect of destroying contaminants found in the contaminated fluid so as to render a decontaminated effluent.

Once a photocatalytic reaction has taken place, and contaminants are destroyed from the contaminated fluid, it is necessary to separate the decontaminated effluent from the photocatalytic particles. Two conventional filtration techniques are frequently used in this regard, namely, dead-end filtration and cross-flow filtration.

Both dead-end and cross-flow filtration techniques each utilize filter units that include one or more "filters" in order to separate the particles of a fluid by size differential. Such filters have pores that extend through the walls of the filter. Once a slurry is subjected to photocatalytic treatment, the resulting mixture (referred to as a "treated slurry") includes relatively large sized photocatalytic particles and smaller sized decontaminated effluent molecules. Dead-end and cross-flow filters only allow for the decontaminated effluent molecules to pass through the filter walls while precluding larger sized photocatalytic particles from passing through the filter walls. This is accomplished through the selection of the size of the pores that are disposed through the filter walls—pore sizes are selected to be smaller than the photocatalytic particles but larger than the decontaminated effluent molecules.

In dead-end filtration, a mixture of decontaminated effluent and photocatalytic particles is directed towards a filter wall with pores formed therethrough. Decontaminated effluent molecules pass through the pores disposed in the filter wall while photocatalytic particles remain and collect on the filter wall. It is both time consuming and inefficient to continuously remove the photocatalytic particles from the dead-end filter wall.

In cross-flow filtration, two directional components are employed. First, a substantial linear velocity is maintained through the filter, i.e., parallel to the filter wall. Second, a substantial pressure differential, also referred to as a transmembrane pressure, is applied across the filter. Such transmembrane pressures can exceed 100 psi. Accordingly, the high transmembrane pressure drives some of the smaller decontaminated effluent molecules through the pores disposed in the filter wall while the high linear velocity continually removes most photocatalytic particles or contaminants away from the filter wall. This inhibits the build-up of materials on the filter wall. When compared to a dead-end filter, a cross-flow filter provides for improved separation technique since photocatalytic particles do not collect on the filter wall.

Selection of pore sizes are critical to ensure the recovery of decontaminated effluents in both dead-end and cross-flow filters. For example, when employing $TiO_2$ photocatalytic particles in the treatment of contaminated water, the primary particle size of a $TiO_2$ particle is approximately 21 nm. (primary particle size is a measure of the average diameter of a single particle). Accordingly, the pore size necessary to separate the $TiO_2$ particles must be less than 21 nm. However, ultrafiltration occurs when pore sizes less than 21 nm. are used to separate decontaminated water molecules from $TiO_2$ particles having an average size of 21 nm. Ultrafiltration, in combination with a high transmembrane pressure, makes it very difficult to efficiently separate water molecules from the $TiO_2$ particles. For example, when 100 liters of a decontaminated effluent are passed through a conventional cross-flow filter (as part of a treated slurry), 90 liters of the decontaminated effluent slurry typically exits the cross-flow filter while only 10 liters of decontaminated effluent permeate through the filter walls for recovery. Thus, only 10% of the decontaminated fluid is recovered. Therefore, the rate of recovery of decontaminated effluent through the walls of conventional cross-flow filters, referred to as "flux," is minimal.

"Foulants", such as sand, clay, oil, silt and cellular fibers, are often found in contaminated fluids. However, most foulants are not destroyed by photocatalytic treatment. Accordingly, they exist in the treated slurry and are passed into conventional filters. Upon entering a conventional filter, the foulants may adversely affect the operation of the filter and potentially degrade the filter over time. For example, a foulant may lodge in the pores of a cross-flow filter due to the high transmembrane pressure. Chemical cleansers are often required to remove foulants from a cross-flow filter. Yet, cleansing of conventional the filters is not always successful.

In summary, several disadvantages are encountered when a treated slurry is passed through either a dead-end or cross-flow filter. First, the flux through the pores of conventional filters is minimal. This translates into the minimal recovery of decontaminated fluid from a treated slurry. Second, foulants typically adversely affect and degrade conventional filters.

SUMMARY OF THE INVENTION

An object of the present invention is to overcome the shortcomings of conventional filtration techniques and provide an improved and more efficient technique to separate decontaminated effluent molecules from a treated slurry. This calls for, among other things, increasing the flux through the pores of a filter as well as inhibiting foulants from adversely affecting and degrading a filter.

Another object of the present invention is to provide a degassified treated slurry to a filter for separation.

A further object of the present invention is to equate the flow of contaminated fluid into a purification system with the flow of decontaminated effluent exiting the purification system.

According to the present invention, an improved filtration technique is provided in connection with the purification of a contaminated fluid. A slurry is formed by mixing a contaminated fluid with photocatalytic particles having an agglomeration property, that is, the photocatalytic particles 306 tend to collect in a mass, or "cluster," under certain conditions. Anatase $TiO_2$ is a photocatalyst that has an agglomeration property. The photocatalytic particles of the slurry are then excited in the presence of contaminated fluid to render a "treated slurry" that includes decontaminated fluid molecules and the photocatalytic particles. The treated slurry is directed into a filter unit that includes at least one separation element. Each separation element has an inner surface that is defined by a channel extending through a substrate, such as a ceramic material. Each separation element also has a plurality of pores which derive from the inner surface and extend through the substrate.

The treated slurry is passed through at least one of the separation elements. When this takes place, the agglomerated photocatalytic particles are allowed to accumulate and form a layer at or near the inner surface of a separation element. Decontaminated fluid molecules reside in the treated slurry are, however, able to easily pass through the formed layer of agglomerated photocatalytic particles and exit the separation element through the plurality of pores of the separation element.

According to the invention, the pore sizes of each separation element are greater than the primary particle size of a photocatalyst. Pore sizes are preferably "substantially larger" than the primary particle size of the photocatalyst, i.e., at least twice the size of the primary particle size of the photocatalyst. More preferably, the pores are sufficiently large to induce microfiltration of the photocatalytic particles. The size of the pores should be empirically determined based on the agglomeration property of the photocatalytic particles as well as the modification of various conditions of the filter unit. For example, when $TiO_2$ is used as a photocatalyst ($TiO_2$ particles have a primary particle size of 21 nm.), pores having diameters of 200 nm. can be utilized in connection with the present inventive technique.

The layer of agglomerated photocatalytic particles formed over the inner surface of a separation element permits the passage of decontaminated effluent molecules while captures foulants. Foulants are therefore precluded from reaching the inner surface and the pores that derive from the inner surface. The formed layer of agglomerated particles thus ensures that foulants cannot detrimentally affect the filter unit or its separation elements. The formed layer, including the foulants captured therein, is periodically removed from the separation elements.

Certain conditions are preferably attained in order to induce the formation of a layer of agglomerated photocatalytic particles on the inner surface of separation elements. First, the transmembrane pressure of each separation element is subjected to a relatively low transmembrane pressure, such as less than 50 psi. Second, shear stresses to which the inner surface of each separation element is subjected are minimized. This ensures that the agglomerated particles are not broken apart and permitted to exit through the enlarged pores. Third, the treated slurry is passed through the filter unit at a relatively low linear velocity, such as less than 1 m/s.

According to one feature of the invention, a treatment system operable to subject a slurry to a photocatalytic reaction and render the treated slurry. A tank is interposed between the treatment system and the filter unit in order to control and regulate the recovery of decontaminated effluent as well as degassify the treated slurry before it is presented to the filter unit. A level detector is associated with the tank to measure the amount of treated slurry therein. An electronic control unit, based on the measurements of the level detector, regulates and limits the recovery of decontaminated effluent by the filter unit. The tank is subjected to atmospheric pressure and releases treated slurry directed to the filter unit towards the bottom of the tank. This ensures that the released treated slurry is substantially degassified.

BRIEF DESCRIPTION OF THE DRAWINGS

The present invention may be better understood from the following detailed description of a presently preferred embodiment of the invention with reference to the accompanying drawings, in which.

DETAILED DESCRIPTION OF A PREFERRED EMBODIMENT OF THE PRESENT INVENTION

As used herein, "contaminated fluid" is a fluid that contains undesirable organic, inorganic products, metals, and possibly microbial cells or other microorganisms. Although contaminants are undesirable in the sense that they are usually toxic when ingested or contacted by humans, the term "undesirable" should not be understood to be restricted to such toxic substances. As used herein, the term "decontaminated effluent" means that the undesirable substances in the contaminated fluid have been altered or modified into a desirable or an acceptable substance, again, usually a substance that is non-toxic. Such alteration or modification can result from the oxidation of contaminants, reduction of contaminants, disinfection and/or sterilization of bacteria, or the like. Normally, such alteration or modification of any organic substance is achieved by decomposing the substance into by-products having a smaller molecular weight than the original contaminated fluid. It should be noted that "fluids" and "effluents" should not be read or construed as being limited to liquids. Rather, such terms should be construed to include all fluids, which further include gases such as air.

The photocatalyst used in connection with the present invention preferably have an agglomeration property, that is, the photocatalytic particles tend to collect in a mass or cluster. preferably used as the photocatalyst, especially when the decontaminated effluent is water. Preferably, the anatase $TiO_2$ is composed of particles having a surface area of 25 $m^2/g$ or greater. In a more preferred embodiment, the anatase $TiO_2$ is composed of particles having a surface area of 75 $m^2/g$. Alternatively, other photocatalyst, such as $TiO_3$, $ZnO$, $CdS$, $CdSe$, $SnO_2$, $SrTiO_3$, $WO_3$, $Fe_2O_3$, and $Ta_2O_5$, can be employed in connection with the present invention. It is not necessary that a photocatalyst, taken individually, has an agglomeration property. Rather, it is sufficient that photocatalytic particles, when combined with another substance, cluster with one another.

Figure 1:
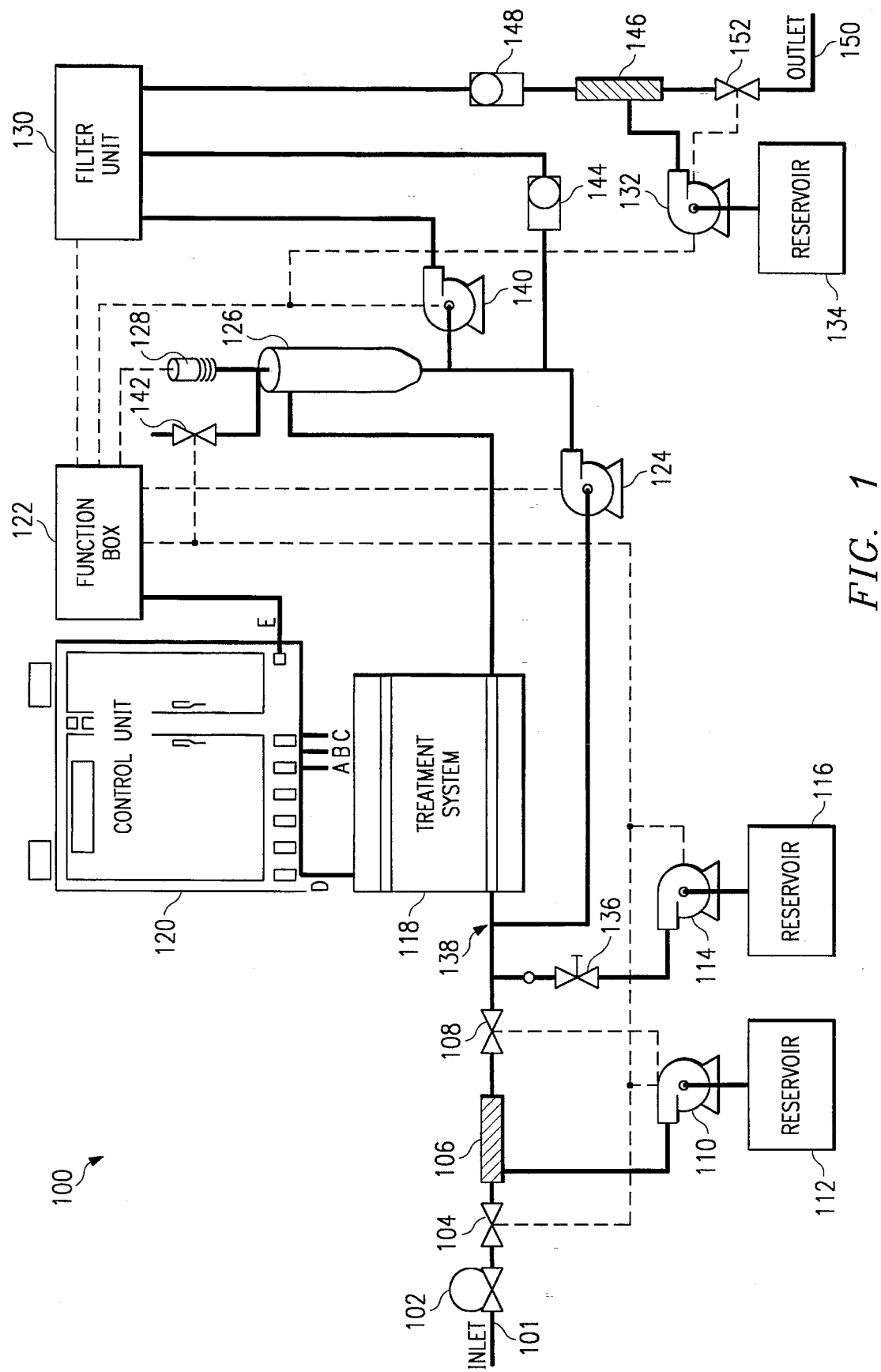
FIG. 1 is a process flow diagram of a purification system.

Referring to FIG. 1, a process flow diagram of a purification system is illustrated. The purification system 100 of FIG. 1 is operable to purify contaminated fluids that enter an inlet 101 and provide a decontaminated effluent at an outlet 150. The pressure and flow of contaminated fluid through the inlet 101 are respectively controlled by a pressure regulator 102 and a solenoid valve 104. After having passed through the solenoid valve 104, contaminated fluid is preferably combined with a pretreatment additive contained in a first reservoir 112. The mixture of the contaminated fluid with the pretreatment additive is carried out by a mixer 106, which is supplied with the additive by the operation of an additive pump 110. Upon mixture of the contaminated fluid with a pretreatment additive, the mixture preferably passes through one or more pH probes 108 which detect the pH levels of the contaminated fluid. The pretreatment additive is preferably used to acidify the pH level (i.e., decrease the pH level) of the contaminated fluid based on the detected pH levels.

Thereafter, other chemical additives, maintained in one or more second reservoirs 116, may be combined with the contaminated fluid at selected times. For example, an oxidizing agent, such as oxygen or hydrogen peroxide, may be added to the contaminated fluid to induce the oxidation of certain contaminants. As a further example, a reactant that provides surrogate electrons which react with the photocatalyst, such as citric acid, may be added to the contaminated fluid in order to induce the reduction of certain other contaminants. This is more fully discussed in U.S. patent application Ser. No. 08/314,548, entitled "Fluid Purification," filed Feb. 22, 1995, which is incorporated by reference herein for all purposes. An additive pump 114, in cooperation with a check valve 136, is utilized to provide the chemical additive from the second reservoir(s) 116 at selected times.

Prior to treatment, the contaminated fluid (preferably having been mixed with certain additives, as described above) is combined with a photocatalyst. This occurs at a junction identified by reference numeral 138. Photocatalyst is supplied to the junction 138 by a positive displacement pump 124. The mixture resulting at the junction 138, specifically, a mixture of contaminated fluid with the photocatalyst, is referred to as a slurry. Once the contaminated fluid is combined with the photocatalyst, to form the slurry, the slurry is passed onto a treatment system 118.

The treatment system 118 is operable to destroy the contaminants found in the contaminated fluid so as to provide a decontaminated effluent. This is preferably accomplished by exciting the photocatalyst in the presence of the contaminated fluid so as to cause a photocatalytic reaction. The treatment system 118 preferably includes one or more photocatalytic cells or weirs through which the slurry is passed. As the slurry passes through the photocatalytic cells it is exposed to light of a sufficient energy to bring about a photocatalytic reaction whereby contaminants in the contaminated fluid are substantially destroyed. While various embodiments of treatment systems may be employed in conjunction with the present invention, the treatment system disclosed in U.S. patent application Ser. No. 08/205,699, entitled "Method and System for Photocatalytic Decontamination," filed Mar. 3, 1994, which is incorporated by reference herein for all purposes, is preferably employed.

Treated slurry is passed form the treatment system 118 to a tank 126. Slurry located at the bottom of the tank 126 is pumped by a centrifugal pump 140 to a filter unit 130 that includes one or more separation elements. A level probe 128 and a vent valve 142 are each associated with the tank 126.

Filter unit 130 is operable to separate the decontaminated effluent from the treated slurry, as is more fully explained with reference to FIGS. 2 and 3. The purpose is to recover the decontaminated effluent present in the treated slurry. More specifically, the treated slurry is separated into (i) a decontaminated effluent, which is the "permeate" of the filter unit 130, and (ii) a residual slurry that is predominantly includes photocatalytic particles (with only small amounts of decontaminated effluent), which is the "retentate" of the filter unit 130.

The permeate—decontaminated effluent—is directed to a back pressure valve 148, through a mixer 146, through a pH probe 152, and then eventually through the outlet 150. A chemical additive, maintained in a third reservoir 134, is supplied to the mixer 146 by a pump 132 for mixture with the decontaminated effluent. Such chemical additive is preferably operable to neutralize the pH of the decontaminated effluent, when necessary, prior to the passage of the decontaminated effluent to the outlet 150.

The retentate—the residual slurry—is directed to a back pressure valve 144. A portion of the residual slurry flows to the positive displacement pump 124 which, in turn, pumps the residual slurry to the junction 138 where its is combined with contaminated fluids (prior to entering the treatment system 118). The remaining portion of the residual slurry is directed to the tank 126.

Various components of the purification system 100 are controlled by an electronic control unit 120. The control unit uses a programmable logic unit, and is connected directly to the treatment system 118 and a junction box 122. The junction box 122 is further connected to each of the following components: the filter units 130; each of the pumps of the system 100 (identified by reference numerals 110, 114, 124, 140, and 132); the pH probes 108 and 152; the level probe 128; the vent valve 142; and the solenoid valve 104.

Through these connections and the programmable logic unit utilized by the control unit, the chemical additives contained in the reservoirs can be supplied at selected time intervals and selected durations. The chemical additive contained in the first reservoir 112, which is operable to acidify the pH level of the contaminated fluid, is supplied to the mixer 106 when the pH probe 108 determines that the pH level of the contaminated fluid has reached a selected level. Similarly, the chemical additive contained in the third reservoir 134, which is operable to neutralize the pH level of the decontaminated effluent upon separation from the treated slurry, is supplied to the mixer 146 when the pH probe 152 determines that the pH level of the decontaminated effluent has reached a selected level. Finally, chemical additives contained in the one or more second reservoirs 116, which are operable to induce reduction and oxidation states, are combined with the contaminated fluid at selected time intervals based on the contaminants contained in the contaminated fluid.

After the purification of contaminated fluids by the treatment system 100, "gas bubbles," such as oxygen, carbon dioxide, nitrogen and other gases may be rendered in the treated slurry. For example, oxygen gas bubbles may be caused by the addition of oxygen, air and/or hydrogen peroxide to a slurry. As a further example, carbon dioxide gas bubbles may be caused by the mineralization of organic compounds and/or pretreatment of certain carbonate and bicarbonate ions with acid, followed by subsequent depressurization, as normally occurs when the treated slurry is passed through the filter unit 130 Such gas bubbles can plug the pores located in the filter unit 130 and thereby preclude the passage and recovery of decontaminated effluent through those pores. Accordingly, it is desirable to degassify the treated slurry before it enters the filter unit 130.

A degassified treated slurry is preferably provided to the filter unit 130.

The tank 126 is operable to degassify the treated slurry. Treated slurry is initially passed into the top of the tank 126, which subjects the treated slurry to atmospheric pressure. This is accomplished by opening the vent valve 142 which is associated with the tank 126. By allowing the treated slurry to depressurize at atmospheric pressure, gas bubbles are rendered in the tank 126. Such gas bubbles rise to the top of the tank 126 and are vented from the tank 126 through the vent valve 142. Thus, a degassified treated slurry resides at the bottom of the tank. This degassified treated slurry is dispensed at the bottom of the tank 126 for repressurization and passage to the filter unit 130.

Preferably, the flow of decontaminated effluent through the outlet 150 should be substantially equivalent to the flow of contaminated fluid through the inlet 101.

Through the operation of the tank 126 in conjunction with the control unit 120, the flow of contaminated fluid through the inlet 101 can be equated with the flow of decontaminated effluent through the outlet 150. One or more separation elements of the filter unit 130 may be "cycled" in order to lessen the flow of decontaminated effluent from the filter unit 130. During the cycling of a particular separation element, decontaminated effluent is substantially precluded from flowing through the pores of the separation element. Thus, as the selected time interval for cycling of a separation element increases, decreasing amounts of decontaminated effluent are recovered. When cycled, treated slurry is directed from the filter unit 130 to back pressure valve 144, to tank 126, and is returned to the filter unit (by centrifugal pump 140). Since a filter unit ordinarily includes multiple separation elements, individual separation elements can be cycled for longer time intervals or more than one separation element can be simultaneously cycled for shorter time intervals, in order to decrease the flow of decontaminated effluent from the filter unit 130.

The level probe 128 associated with tank 126 is operable to detect the level of treated slurry in the tank 126. The level detected by the tank 126 is monitored by the control unit 120. The control unit 120 is operable to modify the cycling of the separation elements of the filter unit 130 based on the changes in the detected levels. If the detected level of treated slurry in the tank 126 increases, the control unit 120 will increase the discharge flow of the filter unit 130 to accommodate the increased amounts of treated slurry headed for the filter unit. Similarly, if the detected level of treated slurry in the tank 126 decreases, the control unit 120 will decrease the discharge flow of the filter unit 130.

Return of residual slurry from the filter unit 130 to the treatment system is maintained by the positive displacement pump 124 at a constant flow rate. The back pressure valves 144 and 148 maintain a substantially constant transmembrane pressure across the filter unit. In this regard, the back pressure valve 148 that receives decontaminated effluent from the filter unit 130, ensures that gas bubbles are not formed in the pores of the filter unit 130.

Figure 2:
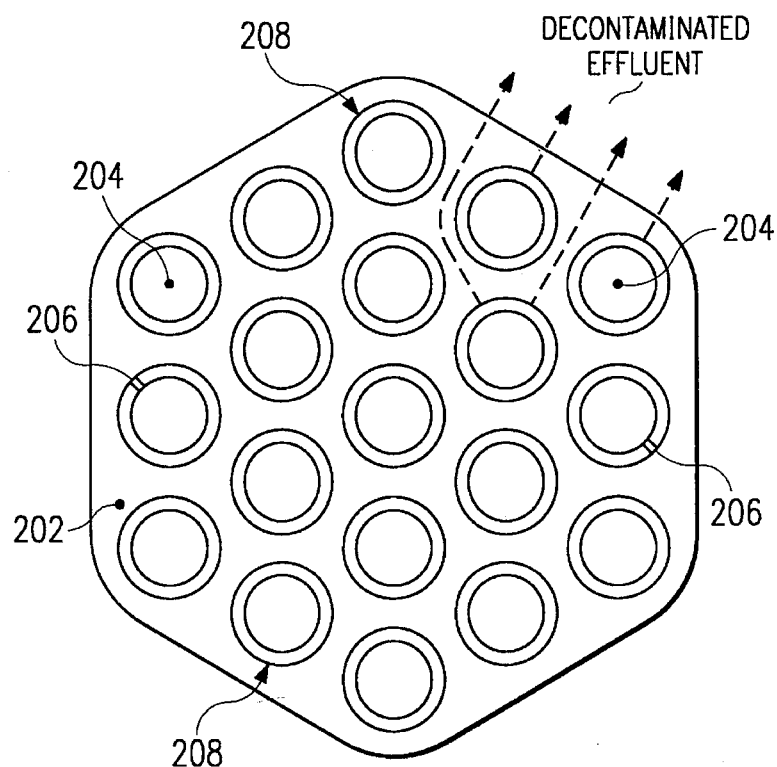
FIG. 2 is a cross-sectional view of a filter unit (or portion thereof).

Referring to FIG. 2, a cross-sectional view of a filter unit 130 is illustrated. The filter unit 130 employs at least one separation element 208. Each separation element 208 has an inner surface that is defined by a channel 204 that extends through a substrate 206. More than one separation elements 208 may be disposed parallel to one another, within a support 202, so as to form the filter unit 130 (or a part thereof). Decontaminated effluent flows in the channel 204 of a separation element 208, through pores (illustrated in FIG. 3) disposed in the substrate 206 of the separation element 208, and finally through the support 202, before reaching an external point. One or more of the supports 202 may be used to form the filter unit 130.

The support 202 is preferably highly permeable and very strong. Preferably, the support 202 is composed of alpha alumina, and possesses an average pore diameter of 12 μm., and a channel diameter of between 4 mm. to 7 mm. Due to the very high permeability of a ceramic support 202, the head loss caused by the flow of decontaminated effluent through the support 202 is negligible. The substrate 206 used to form a separation element 208 preferably comprises one or more sintered layers of porous ceramic having a well defined texture.

As set forth above, one or more separation elements 208 of the filter unit 130 are controlled to regulate permeate flow. This can be accomplished by associating a solenoid valve (not illustrated) with the support 202 of the separation elements 208. When placed in a closed position, the solenoid valve would preclude the recovery of permeate from the separation elements 208. Accordingly, placing the solenoid valve in a closed position recirculates the treated slurry between the filter unit 130 and tank 126 (as well as positive displacement pump 124).

A treated slurry may include several components, such as photocatalytic particles, decontaminated effluent molecules (for example, water molecules), and foulants.

Figure 3:
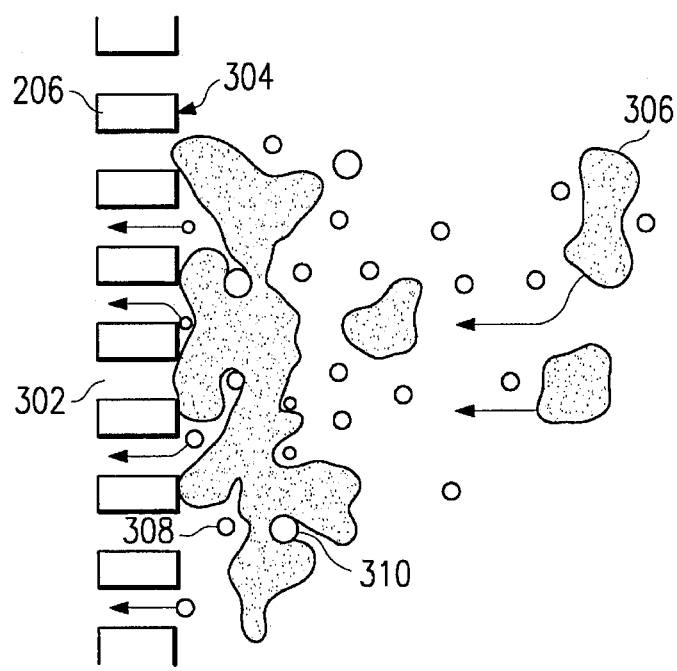
FIG. 3 is a partial cross-sectional view of a separation element of a filter unit.

Referring to FIG. 3, a partial cross-sectional view of a separation element of a filter unit is illustrated. The filter unit 130 includes at least one separation elements that are comprised of a substrate 206. A plurality of pores 302 are formed through the substrate 206 to allow the movement of permeate fluids, i.e., a decontaminated effluent, past the inner surface 304 of the separation element 208 and through the substrate 206. Sizing of the pores 302 determine the permeation rate through the filter unit 130. The pores 302 should be greater than the primary particle size of the photocatalytic particles 306. Pore sizes are preferably "substantially larger" than the primary particle size of the photocatalyst, i.e., at least twice the size the primary particle size of the photocatalyst. More preferably, the pores 302 are sufficiently large so as to induce microfiltration of the treated slurry while only permitting negligible amounts of the photocatalyst to permeate through the pores 302. The size of the pores 302 should be empirically determined based on the agglomeration property of the photocatalytic particles 306 as well as the modification of various conditions of filter unit 130, such as the shear stress, linear velocity and transmembrane pressure of the filter unit 130. When anatase $TiO_2$ is employed as a photocatalyst ($TiO_2$ photocatalytic particles typically have a primary particle size of approximately 21 nm.), the diameters of the individual pores 302 are at least 50 nm. More preferably, the diameters of the individual pores 302 are at least 100 nm. Most preferably, the diameters of the individual pores 302 are at least 200 nm. Having such relatively larger sized pores 302 significantly increases the throughput of decontaminated effluent molecules 308 when compared to conventional techniques.

It is preferable to reduce the transmembrane pressure that exists in a separation element 208. Preferably, a transmembrane pressure of less than 50 psi. is employed. More preferably, a transmembrane pressure of less than 20 psi. is employed. Most preferably, a transmembrane pressure of less than 10 psi. is employed. Enlarged pores 302 and such reduced transmembrane pressures induce increased permeate flow rates and fluxes through the pores 302 of a separation element 208, when compared to conventional filtration techniques which use ultrafiltration to produce minimal permeate flow rates and fluxes.

It is also preferable to reduce the shear stresses applied to the inner surface 304 of a separation element 208. The absence of significant shear stresses accommodates the settlement and growth of agglomerated photocatalytic particles against the inner surface 304 of the separation element 208. Accordingly, the treated slurry is preferably directed towards the inner surface 304 of the separation element 208, and not along the inner surface 304.

It is further preferable to maintain a low linear velocity of the treated slurry as it travels through the separation elements of the filter unit 130. A low linear velocity of the treated slurry induces the agglomeration of photocatalytic particles, and inhibits turbulent flow which has the effect of breaking down the photocatalytic particles such that agglomeration is frustrated. Preferably, the linear velocity of the treated slurry through a separation element 208 is less than 5 m/s. More preferably, the linear velocity of the treated slurry through a separation element 208 is less than 3 m/s. Most preferably, the linear velocity of the treated slurry through a separation element 208 is less than 1 m/s. Preferably, the treated slurry travels at a laminar flow. That is, the Reynolds number of the treated slurry, upon entering a separation element 208, is preferably less than 2100.

A layer of agglomerated photocatalytic particles 306 forms over the inner surface 304 of the separation element 208. Such layer of agglomerated photocatalytic particles 306 acts as a filter in and of itself—it permits decontaminated effluent particles 308 to pass through it while it captures foulants 310. Thus, most foulants 310 never have the opportunity of reaching the inner surface 304 or the pores 302 of a separation element 208. As a consequence, foulants 310 do not impair the inner surface 304 of a separation element 208. Removal of the layer of agglomerated photocatalytic particles therefore also results in the removal of foulants 310 from a separation element 208.

The layer of agglomerated photocatalytic particles 306 continuously grows until the removal or reduction of the layer. Growth of another layer immediately commences upon the removal of the former layer. In this regard, the formation and continuous growth of the layer is dynamic. Growth of the layer through the build-up of photocatalytic particles 306 does not inhibit the recovery of decontaminated effluent 308 since decontaminated effluent molecules can pass through the layer regardless of its size. However, a layer of agglomerated photocatalytic particles 306 is preferably frequently removed or reduced so as to maintain a substantially constant amount of photocatalyst in the treatment system 118 (which partially depends on the amount of photocatalyst recirculated from the filter unit 130).

Agglomerated photocatalytic particles 306 can be removed (or reduced in size) from a separation elements 208 in various ways. For example, high pressure air can be instantaneously applied to a separation element 208 to create a "shock wave" on the inner surface 304 of a separation element 208. This is more fully disclosed in U.S. patent application Ser. No. 08/205,699, entitled "Method and System for Photocatalytic Decontamination," filed Mar. 3, 1994, which is incorporated by reference herein for all purposes. Alternatively, back flushing and back pulsing techniques, as are readily known to one of ordinary skill in the art, can also be employed to remove agglomerated photocatalytic particles 306 from a separation element 208. Preferably, removal of photocatalytic particles 306 from a particular separation element 208 occurs at least once every 10 minutes. More preferably, removal of photocatalytic particles 306 from a particular separation element 208 occurs at least once every 5 minutes. Most preferably, removal of photocatalytic particles 306 from a particular separation element 208 occurs at least once every 1 minute.

While cylindrical separation elements 208 are illustrated in FIG. 2, the geometry and configuration of each separation element 208 may vary significantly. Preferably, the width of a channel 204 of a separation element 208 should be sufficiently wide such that it can accommodate all the photocatalytic particles 306 that are directed to the separation element between instances of cycling of the separation element. Similarly, the width of a channel 204 should be sufficiently narrow such that an adequate amount of photocatalytic particles 306 can agglomerate and collect over the inner surface 304 of a separation element 208.

An example of the present inventive technique is as follows. A treated slurry which included a 0.2% solution (by weight) of $TiO_2$, having an average primary particle size of 21 nm., was directed to a separation element 208 of a filter unit 130. The ceramic substrate 206 of the separation element 208 had an inner surface area of 0.2 $m^2$, and included pores 302 having a diameter of 0.2 micron. A transmembrane pressure of 20 psi. was provided across the separation element 208. The flow rate entering the separation element 208 was approximately 7 liters/minute whereas the permeate flow rate through the pores 302 of the separation element 208 was approximately 6.5 liters/minute. The permeate flow rate obtained through the pores 302 of the separation element 208 in the absence of photocatalytic particles (commonly referred to as the "clean water flux") was also approximately 6.5 liters/minute. Flux through the pores 302 was therefore 32.5 liters/minute $m^2$ (the permeate flow rate divided by the surface area of the separation element 208). The formation and build-up of agglomerated photocatalytic particles 306 over the inner surface 304 of the separation element 208 did not therefore impede the recovery of decontaminated effluent. The linear velocity of the treated slurry entering the separation element 208 was 0.5 m/s, and the linear velocity of the decontaminated effluent through the pores 302 of the separation element 208 was 0.03 m/s. Substantially no photocatalytic particles 306 passed through the pores 302.

The present invention is, therefore, well adapted to carry out the objects and attain the ends and advantages mentioned, as well as others inherent therein. While a presently preferred embodiment of the invention has been given for purposes of disclosure, alternate embodiments, changes and modifications in the details of construction, interconnection and arrangement of parts will readily suggest themselves to those skilled in the art, after having the benefit of this disclosure. The present invention is not limited to the specific examples illustrated and described herein. All such alternate embodiments, changes and modifications are included within the spirit of the invention and the scope of the appended claims.

What is claimed is:

1. A method for recovering a decontaminated effluent after photocatalytic decontamination of a contaminated fluid, comprising:

forming a slurry by mixing a contaminated fluid with photocatalytic particles having an agglomeration property;

exciting the photocatalytic particles of the slurry to render a treated slurry that includes a decontaminated fluid and agglomerated photocatalytic particles;

directing the treated slurry into a filter unit that includes at least one separation element, each separation element having an inner surface defined by a channel extending through a substrate, each separation element having a plurality of pores which derive from the inner surface and extend through the substrate;

passing the treated slurry through a separation element under certain conditions designed to induce the agglomerated photocatalytic particles to accumulate and form a layer at or near the inner surface of the separation element; and recovering the decontaminated fluid through the plurality of pores of the separation element.

2. The method of claim 1, wherein:

the photocatalytic particles have a primary particle size, each of the plurality of pores is greater than the primary particle size of the photocatalytic particles.

3. The method of claim 1, wherein:

the agglomerated photocatalytic particles are $TiO_2$.

4. The method of claim 3, wherein:

the diameter of each of the plurality of pores is greater than 21 nm.

5. The method of claim 3, wherein:

the diameter of each of the plurality of pores is at least 200 nm.

6. The method of claim 1, wherein:

the layer of agglomerated photocatalytic particles is operable to capture foulants therein.

7. The method of claim 1, further comprising:

periodically removing the layer of agglomerated photocatalytic particles.

8. The method of claim 7, wherein:

the removal of the layer of agglomerated photocatalytic particles occurs at least once every 5 minutes.

9. The method of claim 7, wherein:

the removal of the layer of agglomerated photocatalytic particles occurs at least once every 1 minute.

10. The method of claim 1, further comprising:

substantially minimizing the shear stresses to which the inner surface of each separation element is subjected.

11. The method of claim 10, wherein:

the treated slurry passes through the separation element at a laminar flow.

12. The method of claim 1, wherein:

the treated slurry is passed through the filter unit at a linear velocity of less than 5 m/s.

13. The method of claim 1, wherein:

the treated slurry is passed through the filter unit at a linear velocity of less than 3 m/s.

14. The method of claim 1, wherein:

the treated slurry is passed through the filter unit at a linear velocity of less than 1 m/s.

15. The method of claim 1, wherein:

each separation element is subjected to a transmembrane pressure less than 50 psi.

16. The method of claim 1, wherein:

each separation element is subjected to a transmembrane pressure less than 20 psi.

17. The method of claim 1, wherein:

each separation element is subjected to a transmembrane pressure less than 10 psi.

18. The method of claim 1, wherein:

the photocatalytic particles are excited by irradiating the photocatalytic particles with ultraviolet light.

19. The method of claim 1, further comprising:

substantially degassifying the treated slurry.

20. A system for fluid purification, comprising:

a system for treating contaminated fluids by a photocatalytic process, the system being operable to render a treated slurry which includes a decontaminated effluent and photocatalytic particles having an agglomeration property;

a filter unit including at least one separation element, each separation element having an inner surface defined by a channel extending through a substrate and a plurality of pores which derive from the inner surface and extend through the substrate, each of the plurality of pores being larger than individual ones of the photocatalytic particles, the filter unit being operable to separate the treated slurry into decontaminated effluent and a residual slurry, the decontaminated effluent being recovered after passing through the plurality of pores of a separation element; and a pump to return the residual slurry to the treatment system.

21. The system for fluid purification of claim 20, further comprising:

a tank interposed between the treatment system and the filter unit for storage of the treated slurry;

a level detector for measuring the amount of treated slurry in the tank; and an electronic control unit which limits the recovery of decontaminated effluent based on the measurements of the level detector.

22. The system of fluid purification of claim 21, wherein:

the tank is subjected to atmospheric pressure and releases treated slurry directed to the filter unit towards the bottom of the tank such that the released treated slurry is substantially degassified.

\* \* \* \* \*

UNITED STATES PATENT AND TRADEMARK OFFICE
CERTIFICATE OF CORRECTION

PATENT NO.   : 5,589,078
DATED        : Dec. 31, 1996
INVENTOR(S)  : Brian E. Butters, et al It is certified that error appears in the above-indentified patent and that said Letters Patent is hereby corrected as shown below:

The drawing sheet, consisting of Fig. 1, should be deleted to be replaced with the drawing sheet, consisting of Fig. 1, as shown on the attached page.

Signed and Sealed this

Fifth Day of August, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,589,078

DATED : Dec. 31, 1996

INVENTOR(S) : Brian E. Butters, et al.

Page 2 of 2

It is certified that error appears in the above-indentified patent and that said Letters Patent is hereby corrected as shown below:

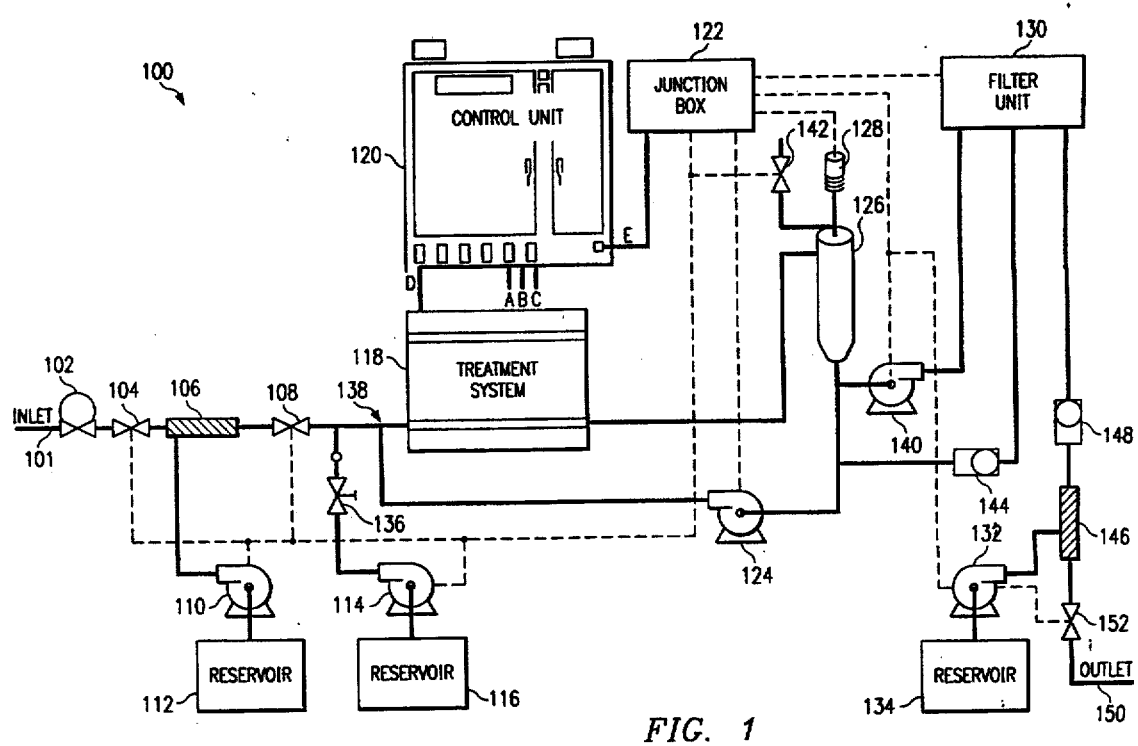

FIG. 1